US010317643B2

(12) United States Patent
Sanchen

(10) Patent No.: US 10,317,643 B2
(45) Date of Patent: Jun. 11, 2019

(54) OPTICAL ASSEMBLY COMPRISING A CONICAL MIRROR

(71) Applicant: Hilti Aktiengesellschaft, Schaan (LI)

(72) Inventor: Guenter Sanchen, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/538,563

(22) PCT Filed: Dec. 22, 2015

(86) PCT No.: PCT/EP2015/080921
§ 371 (c)(1),
(2) Date: Jun. 21, 2017

(87) PCT Pub. No.: WO2016/102535
PCT Pub. Date: Jun. 30, 2016

(65) Prior Publication Data
US 2018/0003922 A1 Jan. 4, 2018

(30) Foreign Application Priority Data
Dec. 22, 2014 (EP) .................... 14199787

(51) Int. Cl.
G02B 7/182 (2006.01)
G02B 19/00 (2006.01)
G01C 15/00 (2006.01)

(52) U.S. Cl.
CPC .......... G02B 7/182 (2013.01); G01C 15/004 (2013.01); G02B 19/0052 (2013.01); G02B 19/0071 (2013.01)

(58) Field of Classification Search
CPC .... G01C 15/00; G01C 15/002; G01C 15/004; G01C 15/02; G01C 15/12; G02B 7/182; G02B 19/0052; G02B 19/0071
(Continued)

(56) References Cited

U.S. PATENT DOCUMENTS 4,975,573 A * 12/1990 Girard .................... G01M 11/04
250/252.1
2002/0054433 A1* 5/2002 Tacklind .............. G01C 15/004
359/618
(Continued)

FOREIGN PATENT DOCUMENTS

JP 6-331356 A 12/1994
JP 2000-346646 A 12/2000
WO WO 00/70375 A1 11/2000

OTHER PUBLICATIONS

PCT/EP2015/080921, International Search Report dated Mar. 30, 2016 (Two (2) pages).
(Continued)

Primary Examiner — Stephone B Allen
Assistant Examiner — Travis S Fissel
(74) Attorney, Agent, or Firm — Crowell & Moring LLP

(57) ABSTRACT

An optical assembly is disclosed. The optical assembly includes a collimating lens which collimates a divergent laser beam. A conical mirror has a reflecting cover surface and deforms a laser beam, which propagates in the direction of the conical axis, into an annular beam in a propagation plane perpendicular to the conical axis. An optics carrier has a first carrier element on which the collimating lens is fixed and a second carrier element on which the conical mirror is fixed. A connection device has at least one connection element which connects the first and second carrier elements to one another. The at least one connection element is arranged askew to the conical axis of the conical mirror.

7 Claims, 3 Drawing Sheets

(58) Field of Classification Search
USPC ........ 359/641, 724–726, 809, 811, 871, 868, 359/834, 872; 33/262, 276–280, 290, 33/291, 299
See application file for complete search history.

(56) References Cited

U.S. PATENT DOCUMENTS

| | | | |
|---|---|---|---|
| 2010/0060904 A1* | 3/2010 | Keightley | G01B 11/2513 356/608 |
| 2012/0090184 A1* | 4/2012 | Zimmermann | G01B 11/26 33/291 |
| 2012/0275043 A1* | 11/2012 | Sun | G01C 15/004 359/868 |

OTHER PUBLICATIONS

European Search Report issued in European counterpart application No. 14199787.4-1562 dated Jun. 16, 2015, with Statement of Relevancy (Six (6) pages).

* cited by examiner

OPTICAL ASSEMBLY COMPRISING A CONICAL MIRROR

This application claims the priority of International Application No. PCT/EP2015/080921, filed Dec. 22, 2015, and European Patent Document No. 14199787.4, filed Dec. 22, 2014, the disclosures of which are expressly incorporated by reference herein.

BACKGROUND AND SUMMARY OF THE INVENTION

The present invention relates to an optical assembly comprising a conical mirror.

US 2012/0275043 discloses a known optical assembly comprising a conical mirror, a collimation lens, an optics carrier comprising a first carrier element to which the collimation lens is attached and a second carrier element to which the conical mirror is attached, and a connection device, which connects the first and second carrier elements to each other. The optical assembly is arranged in the beam path of the laser beam behind a laser beam source. The laser beam source generates a diverging laser beam, which strikes the collimation lens and leaves the collimation lens as a collimated laser beam. The conical mirror has a reflecting exterior surface, which deflects the collimated laser beam and forms it into an annular beam, which propagates out in a propagation plane perpendicular to the conical axis of the conical mirror.

The connection device, which connects the first and second carrier elements to each other, comprises three or more thin-walled connection elements, which connect the carrier elements to each other. In doing so, the thin-walled connection elements are arranged parallel to the conical axis of the conical mirror and the lines ("extension lines") intersect on the conical axis. The perpendicular orientation of the thin-walled connection elements has the disadvantage that the annular beam is fully interrupted in the region of the connection elements and interruptions occur in the annular beam when projecting the annular beam on to a substrate. The width of the interruption increases as the distance to the conical mirror increases.

The object of the present invention is to further develop an optical assembly having a conical mirror so as to avoid interruptions in the annular beam during the projection onto a substrate.

According to the invention, it is provided that at least one connection element is arranged askew to the conical axis of the conical mirror. Two lines are described as being askew when they do not intersect nor are they arranged parallel to each other.

The skewed arrangement of the connecting element to the conical axis of the conical mirror has the advantage that a portion of the annular beam can propagate above the connection element and a portion of the annular beam can propagate below the connection element; only the portion of the annular beam which strikes the connection element directly is blocked out. The blocked-out portion of the annular beam can result in the brightness of the annular beam being reduced in this angle range, wherein this reduction can hardly be perceived by the user. The width of the angle range in which the brightness of the annular beam is reduced can be adjusted via the tilt angle of the connection element; the greater the inclination at which the connection element is arranged, the broader the angle range having the reduced brightness.

In a development, the connection device has a number of 2n, n≥1 connection elements, wherein n connection elements are designed as descending connection elements and n connection elements are designed as ascending connection elements, and the descending and ascending connection elements are arranged in a peripheral direction of the conical mirror in an alternating sequential manner. The oppositely oriented arrangement of the connection elements improves the stability of the connection between the carrier elements.

Preferably, the first carrier element, the second carrier element, and the connection device are designed in an integral manner. The integral design of the optics carrier and the connection device has the advantage that the adjustment of the carrier elements already occurs when manufacturing the one-piece optics carrier.

In a particularly preferred manner, the first carrier element, the second carrier element and the connection device are designed as an integral die-cast part. The design as a die-cast part has the advantage that complex shapes can also be executed for the connection elements.

Preferably, the connection elements are designed in a helical shape. The helically shaped design of the connection elements allows one to further reduce the portion of the annular beam which is blocked out by the connection elements, compared to flat connection elements. Due to the inclining of the connection elements, a connection element is struck by various parts of the annular beam. The helically shaped design of the connection elements results in each part of the annular beam, which propagates radially out from the reflecting exterior surface of the conical mirror, striking the connection element in a perpendicular manner and the blocked-out portion of the annular ring being minimized.

In a preferred embodiment, the at least one connection element is inclined by an inclination angle of between 5° and 45° to the conical axis. One can adjust the width of the angle range, in which the brightness of the annular beam is reduced, via the inclination angle of the connection elements to the conical axis. The greater the inclination at which the connection elements are arranged, the broader the angle range having the reduced brightness.

Preferably, the at least one connection element in the propagation plane has a distance to the conical axis of between 5 mm and 20 mm. A distance between 5 mm and 20 mm to the conical axis allows for a compact design of the optical assembly.

In a preferred embodiment, the connection device has a number of at least 3 connection elements, wherein the thickness of the connection elements is between 0.1 mm and 0.7 mm. To ensure sufficient stability of the connection device, one connection element can be used, which must be designed to be correspondingly thick. Alternatively, multiple thin-walled connection elements with wall thicknesses between 0.1 mm and 0.7 mm can offer sufficient stability.

Embodiments of the invention are described below by means of the drawings. It is intended to show the embodiments not necessarily to scale; rather, the drawings, where useful for explanation purposes, are executed in a schematic and/or slightly distorted manner. Regarding amendments to the teachings directly evident from the drawings, one shall refer to the relevant prior art. In doing so, one shall take into account that diverse modifications and changes pertaining to the form and detail of an embodiment can be undertaken without departing from the general idea of the invention. The features of the invention disclosed in the description, drawings and claims may be essential both individually on their own as well as in any combination for the further development of the invention.

Also falling within the scope of the invention are all combinations of at least two of the features disclosed in the description, drawings and/or claims. The general idea of the invention is not restricted to the exact form or detail of the preferred embodiments depicted and described hereafter, or limited to a subject matter that would be restricted in comparison to the subject matter claimed in the claims. For given measurement ranges, values lying within the mentioned limits shall also be disclosed as limit values and one shall be able to use and claim these as one wishes. For the sake of simplicity, the same reference signs are used for identical or similar parts, or parts with an identical or similar function.

DETAILED DESCRIPTION OF THE DRAWINGS

Figure 1:
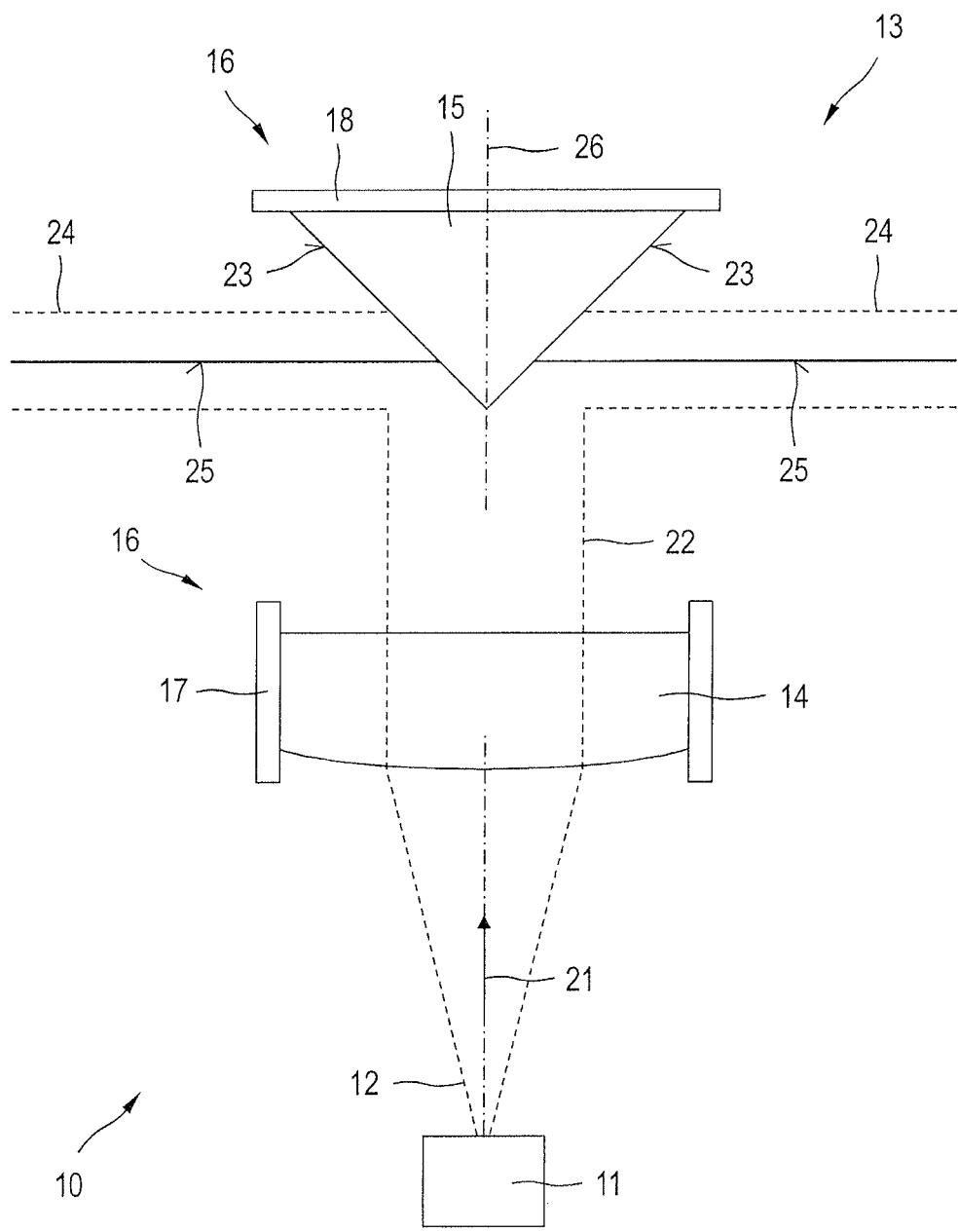
FIG. 1 illustrates a laser system with a laser beam source, which generates a laser beam, and an optical assembly, which is arranged in the beam path of the laser beam behind the laser beam source, and comprises a collimation lens, a conical mirror, and an optics carrier.

FIG. 1 depicts a laser system 10 having a laser beam source 11, which generates a laser beam 12, and an optical assembly 13, which is arranged in the beam path of laser beam 12 behind laser beam source 11. Optical assembly 12 comprises a collimation lens 14, a conical mirror 15, and an optics carrier 16 with a first carrier element 17 to which collimation lens 14 is fixed and a second carrier element 18 to which conical mirror 15 is fixed.

Laser beam source 11 is designed as a semiconductor laser, which generates laser beam 12 in the visible spectrum; for example, a red laser beam having a wavelength of 635 nm or a green laser beam having a wavelength of 510 nm or 532 nm. After laser beam 12 leaves laser beam source 11, divergence causes the laser beam to expand, i.e., the beam diameter of the laser beam increases with the distance of the laser beam from laser beam source 11.

Divergent laser beam 12 propagates in propagation direction 21 and strikes collimation lens 14, which forms laser beam 12 into a collimated laser beam 22. Collimated laser beam 22 propagates in propagation direction 21 and strikes conical mirror 15. Conical mirror 15 has the geometric shape of a straight circular cone. A circular cone is a cone with a circular base area. A cone is a geometric body that results when all points of a bounded surface lying in one plane are connected in a straight line to a point that lies outside of the plane. The area is referred to as base area, the boundary line of the base area is referred to as the directrix, and the point is referred to as the cone tip. The distance of the cone tip from the base area defines the height of the cone. The connection lines of the cone tip to the directrix are referred to as surface lines, and the group of surface lines is referred to as the exterior surface of the cone. Regarding a straight cone with a circular base area, the cone tip lies on the conical axis, which runs perpendicular to the base area through the center of the base area.

Collimated laser beam 22 strikes exterior surface 23 of conical mirror 15, which is designed to be reflective for the wavelength of laser beam 22. Laser beam 22 is deflected at exterior surface 23 and converted into an annular beam 24. Annular beam 24 propagates in a propagation plane 25, which is arranged perpendicular to conical axis 26.

Figure 2:
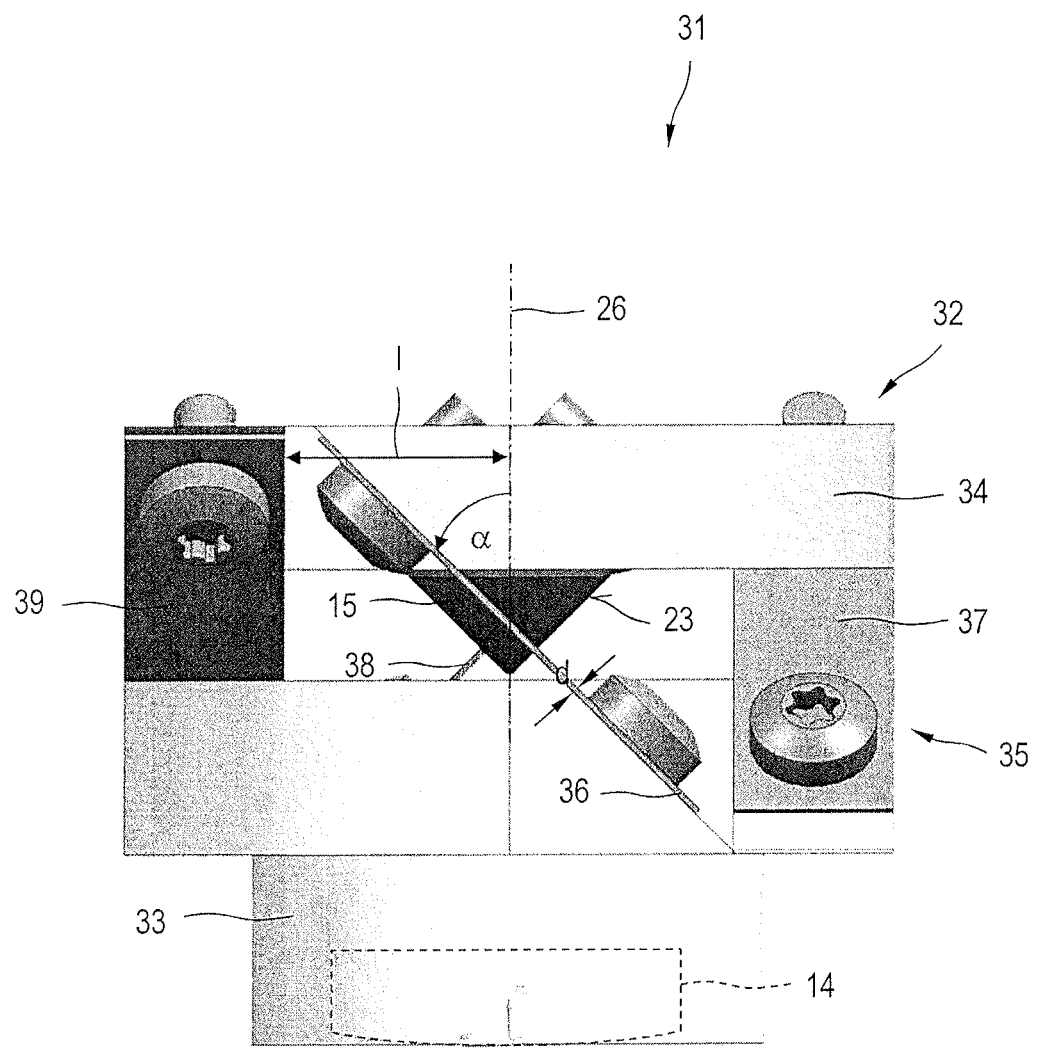
FIG. 2 illustrates a first embodiment of an optical assembly according to the invention consisting of a collimation lens, a conical mirror, and a multi-component optics carrier with a first and second carrier element, which are connected by means of four flat connection elements.

FIG. 2 depicts a first embodiment of an optical assembly 31 according to the invention comprising a collimation lens 14, conical mirror 15, a multi-component optics carrier 32 having a first carrier element 33 to which collimation lens 14 is fixed and a second carrier element 34 to which conical mirror 15 is fixed, and a connection device 35, which connects first and second carrier elements 33, 34 to each other.

Connection device 35 comprises four flat connection elements 36, 37, 38, 39, which are designed as thin-walled sheet metal parts. Connection elements 36, 38 are designed as descending connection elements and connection elements 37, 39 are designed as ascending connection elements. Descending connection elements 36, 38 and ascending connection elements 37, 39 are arranged in a peripheral direction of conical mirror 15 in an alternating sequential manner. The oppositely oriented arrangement of the connection elements 36-39 improves the stability of the connection between the carrier elements 33, 34.

Connection elements 36-39 are each inclined at an inclination angle $\alpha$ to conical axis 26 of conical mirror 15 and have a distance 1 to conical axis 26. In the embodiment of optical assembly 31, inclination angle $\alpha$ is approx. 45° to conical axis 26. By means of inclination angle $\alpha$ of the connection elements, one can adjust the width of the angle range in which the brightness of annular beam 24 is reduced; the greater the inclination at which the connection elements 36-39 are arranged, the broader the angle range having the reduced brightness. Distance 1 of connection elements 36-39 to conical axis 26 lies between 5 mm and 20 mm, and in the embodiment of optical assembly 31, it corresponds approximately to the diameter of conical mirror 15. A distance between 5 mm and 20 mm to conical axis 26 allows for a compact design of optical assembly 31. Connection elements 36-39 are designed as thin-walled sheet metal parts having a wall thickness d; wall thickness d is between 0.1 mm and 0.7 mm.

A reduction of up to 20% is acceptable for users and connection device 35 is configured in such a manner that 20% is not exceeded. Annular beams with beam widths between 2 mm and 6 mm are suitable for typical measurement tasks on construction sites. Brightness reduction is dependent on inclination angle $\alpha$ of connection elements 36-39 to conical axis 26 and on wall thickness d of connection elements 36-39. The smaller wall thickness d is, the smaller the inclination angle $\alpha$ to conical axis 26 can be designed. For narrow beam widths (2 mm), an inclination angle $\alpha$ of 20° to 45° and a wall thickness d of 0.3 mm maximum are suitable for keeping the reduction below 20%. For medium beam widths (4 mm), inclination angles $\alpha$ between 10° and 40° and wall thickness d of 0.5 mm maximum are suitable to keep the reduction below 20%. For wide beam widths (6 mm), inclination angles $\alpha$ between 5° and 45° and wall thickness d between 0.1 mm and 0.7 mm are suitable to keep the reduction below 20%.

Figure 3:
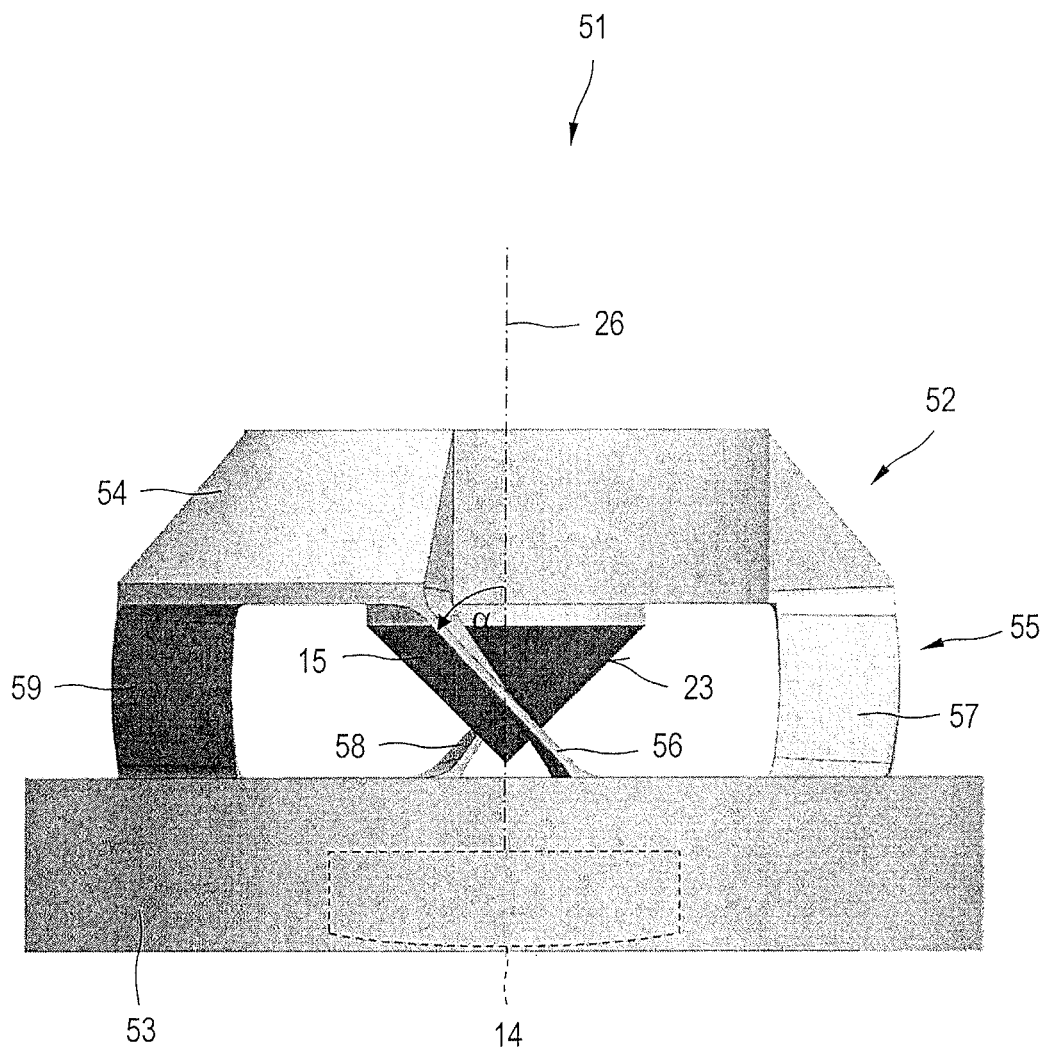
FIG. 3 illustrates a second embodiment of an optical assembly according to the invention, consisting of a collimation lens, a conical mirror and a one-piece optics carrier with a first and second carrier element, which are connected by means of four helically shaped connection elements.

FIG. 3 depicts a second embodiment of an optical assembly 51 according to the invention consisting of a collimation lens 14, conical mirror 15, a one-piece optics carrier 52 with a first carrier element 53 to which collimation lens 14 is fixed and a second carrier element 54 to which conical mirror 15 is fixed, and a connection device 55, which connects first and second carrier elements 53, 54 to each other.

Connection device 55 comprises four connection elements 56, 57, 58, 59, which with first and second carrier elements 53, 54 form a one-piece optics carrier 52. Connection elements 56, 58 are designed as descending connection elements and connection elements 57, 59 are designed as ascending connection elements; descending connection elements 56, 58 and ascending connection elements 57, 59 are arranged in the peripheral direction of conical mirror 15 in an alternating sequential manner.

Connection elements 56, 57, 58, 59 of connection device 55 differ from connection elements 36, 37, 38, 39 of connection device 35 in that they are designed in a helical shape. The helically shaped design of connection elements 56, 57, 58, 59 enables one to further reduce the portion of the annular beam which is blocked out by connection elements 56, 57, 58, 59, compared to flat connection elements. In regard to inclination angle $\alpha$ to conical axis 26, distance 1 to conical axis 26, and wall thickness d, the same restrictions apply for connection elements 56-59 as for connection elements 36-39 of FIG. 2.

Collimated laser beam 22 is deflected at reflecting exterior surface 23 of conical mirror 15 and converted into annular beam 24. Due to the inclination of the connection elements, one connection element is struck by various parts of annular beam 24. The helically shaped design of connection elements 56, 57, 58, 59 results in each part of the annular beam, which propagates radially from reflecting exterior surface 23, striking the connection element in a perpendicular manner and the blocked-out portion of annular ring 24 being minimized.

The invention claimed is:

1. An optical assembly, comprising:
   a collimation lens, wherein the collimation lens collimates a laser beam to form a collimated laser beam;
   a conical mirror with a reflecting exterior surface, wherein the conical mirror converts the collimated laser beam, which propagates in a direction of a conical axis of the conical mirror, into an annular beam and deflects the annular beam to propagate in a propagation plane that is perpendicular to the conical axis;
   an optics carrier with a first carrier element, wherein the collimation lens is fixed to the first carrier element, and with a second carrier element, wherein the conical mirror is fixed to the second carrier element; and
   a connection device with at least one connection element, wherein the at least one connection element connects the first carrier element and the second carrier element to each other;
   wherein the at least one connection element is disposed askew to the conical axis of the conical mirror;
   wherein the connection device has a number of 2n of connection elements where n≥1, wherein n connection elements are first connection elements and n connection elements are second connection elements, and wherein the first and the second connection elements are disposed in a peripheral direction of the conical mirror in an alternating sequential manner;
   wherein the first connection elements are oriented along the peripheral direction of the conical mirror in a first circling direction and the second connection elements are oriented along the peripheral direction of the conical mirror in a second circling direction and wherein the first and the second circling directions are oriented oppositely to each other in the peripheral direction of the conical mirror.

2. The optical assembly according to claim 1, wherein the first carrier element, the second carrier element, and the connection device are an integral part.

3. The optical assembly according to claim 2, wherein the first carrier element, the second carrier element, and the connection device are a die-cast part.

4. The optical assembly according to claim 1, wherein the at least one connection element is helically shaped.

5. The optical assembly according to claim 1, wherein the at least one connection element is inclined at an inclination angle of between 5° and 45° to the conical axis.

6. The optical assembly according to claim 1, wherein the at least one connection element has in the propagation plane a distance to the conical axis of between 5 mm and 20 mm.

7. The optical assembly according to claim 1, wherein the connection device has at least 3 connection elements and wherein a wall thickness of the connection elements is between 0.1 mm and 0.7 mm.

* * * * *